(12) United States Patent
Golonka et al.

(10) Patent No.: US 11,210,188 B1
(45) Date of Patent: Dec. 28, 2021

(54) SYSTEMS AND METHODS FOR PROCESSOR MONITORING AND RECOVERY

(71) Applicant: Raytheon Company, Waltham, MA (US)

(72) Inventors: Walter M. Golonka, Fullerton, CA (US); Tyler J. Ulinskas, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/313,275

(22) Filed: May 6, 2021

(51) Int. Cl.
*G06F 11/00* (2006.01)
*G06F 11/22* (2006.01)
*G06F 11/27* (2006.01)
*G06F 11/30* (2006.01)
*G06F 11/07* (2006.01)
*G06F 9/455* (2018.01)

(52) U.S. Cl.
CPC ...... *G06F 11/2236* (2013.01); *G06F 9/45541* (2013.01); *G06F 11/0772* (2013.01); *G06F 11/0793* (2013.01); *G06F 11/27* (2013.01); *G06F 11/3024* (2013.01); *G06F 11/3058* (2013.01)

(58) Field of Classification Search
CPC ............. G06F 11/2236; G06F 11/0772; G06F 11/0793; G06F 11/27; G06F 11/3024; G06F 11/3058; G06F 11/22; G06F 11/0766; G06F 11/3003; G06F 9/3861; G06F 9/45533; G06F 9/45541
See application file for complete search history.

(56) References Cited

U.S. PATENT DOCUMENTS

| 7,162,621 | B2 | 1/2007 | Kissell | |
| 7,562,265 | B2 * | 7/2009 | Azevedo | G06F 11/0709 713/2 |
| 8,201,038 | B2 * | 6/2012 | Graas | G06F 11/008 714/745 |
| 8,898,516 | B2 * | 11/2014 | Honda | G06F 11/2043 714/10 |
| 9,311,248 | B2 | 4/2016 | Wagner | |

(Continued)

OTHER PUBLICATIONS

Jin, et al., "FTXen: Making Hypervisor Resilient to Hardware Faults on Relaxed Cores", University of Southern California San Diego, 2015, pp. 451-462.

*Primary Examiner* — Anthony J Amoroso
(74) *Attorney, Agent, or Firm* — Burns & Levinson, LLP; Joseph M. Maraia

(57) ABSTRACT

A fault recoverable computer system including an instruction table having a plurality of processor instructions. The system also includes at least one sensor arranged to monitor an environmental condition and output sensor data. A monitor module is arranged to receive sensor data and/or processor state information. A testing module is arranged to perform a plurality of self-tests including a first self-test of the computer system and, if the first self-test fails, output a failure notification. A recovery module is arranged to update the instruction table in response to receiving the failure notification. The update includes replacing a first processor instruction arranged to perform a first function with a replacement set of processor instructions configured to alternatively perform the first function.

19 Claims, 6 Drawing Sheets

(56) References Cited

U.S. PATENT DOCUMENTS

| | | |
|---|---|---|
| 10,331,531 B2 * | 6/2019 | Venu .................. G06F 11/0721 |
| 10,628,275 B2 | 4/2020 | Terechko et al. |
| 10,891,216 B2 | 1/2021 | Calvano |
| 2004/0199813 A1 | 10/2004 | Hillman et al. |
| 2011/0102005 A1 | 5/2011 | Feng et al. |
| 2016/0378628 A1 | 12/2016 | Nguyen et al. |

* cited by examiner

| INSTRUCTION | ALTERNATIVE SET | DESCRIPTION |
|---|---|---|
| ADD | SUB R3, 0, R3<br>SUB R1, R2, R3 | INTEGER ADD USING SUBTRACT<br>NEGATE R3<br>R1 = R2 −R3; ANSWER IN R1 |
| SUB | MUL R3, -1<br>ADD R1, R2, R3 | INTEGER SUBTRACT USING ADD<br>NEGATE R3 WITH MULTIPLY<br>R1 = R2+R3; ANSWER IN R1 |
| MUL | START:<br>MOV R3, TERM1<br>MOV R1, 0<br>MUL_SUBSTITUTION:<br>ADD R1, TERM2<br>SUB R3, 1<br>CBNZ MUL_SUBTITUTION | INTEGER MULTIPLY USING ADD LOOP<br>ANSWER (R1) = TERM1 X TERM2<br>SET LOOP REGISTER TO ONE TERM.<br>ADD SECOND TERM TO RESULT<br>CONTINUE LOOPING UNTIL ZERO (CBNZ<br>BRANCHES IF NON-ZERO BACK TO<br>MUL_SUBTITUTION |

FIG. 5

SYSTEMS AND METHODS FOR PROCESSOR MONITORING AND RECOVERY

TECHNICAL FIELD

This application relates generally to computer systems and, more particularly, to fault monitoring and recovery techniques.

BACKGROUND

Computer systems and processors are commonly used in many electronic devices and systems today including consumer products, appliances, military systems, or vehicles operating on land, in air, or in space. Computing systems or processors typically include a reduced instruction set computing (RISC) architecture or a complex instruction set computer (CISC) architecture. Advanced RISC machine (ARM) is a family of RISC architectures implemented in computing systems such as a system-on-a-chip (SoC) or system-on-a-module (SoM). ARM architectures include design cores that implement ARM-based instruction sets. Other architectures include the x86 family or x64 family of instruction set architectures (ISA). Design cores may be implemented in hardware integrated circuits (IC) or programmed into a field programmable gate array (FPGA). MicroBlaze is a soft microprocessor core implemented in general-purpose memory and logic of an FPGA.

Computer processors are not immune to instruction failures given the density of the fabricated logic of current processors, which makes them susceptible to failures under adverse environmental conditions (i.e., temperature or radiation extremes) from normal missions, electronic warfare, or cyber attacks. This leads to resiliency issues in certain electronic assets, such as space systems or weapon systems. One such defect or failure is a processor instruction that does not behave as intended. This may result in incorrect behavior when executing software on a processor, including a SoC, which may result in improper operations of an asset such an automobile, aircraft, radar system, satellite, or any system relying on operations of the processor.

While various conventional computing systems and processors include fault tolerance features such as redundant processor cores or duplicate fail-over components, there remains a need for improved processor resiliency and failure recovery, especially with respect to processors that are not readily or cost-effectively accessible to system operators.

SUMMARY

The application, in various implementations, addresses deficiencies associated with computing system fault tolerance and failure recovery techniques. The application includes exemplary devices, systems and methods for monitoring a computer processor and enabling the processor to effectively recover from detected faults.

This application describes exemplary computing systems and/or processors, devices, and methods that provide resiliency in adverse environments (e.g., high/low temps and/or high radiation) found in space or weapon systems environments to enable an added survivability duration. Exemplary systems, devices, and methods may: 1) Perform one or more self-tests to identify erroneous hardware instructions and re-map those instructions to pre-defined alternative and/or virtual instructions; 2) Operationally switch to the pre-defined alternative and/or virtual instructions that perform the same or equivalent function as the existing hardware-provided instructions, i.e., "just in time" behavior; 3) Perform one or more self-tests during power on; 4) Perform one or more self-tests during run-time idle or run-time interrupt states; and/or 5) Monitor sensors to adjust self-test execution periodicity.

Exemplary systems, devices, and/or methods may be implemented in: 1) a hardware processor, e.g., a fabricated integrated circuit (IC), 2) a Processor Soft Core, e.g., a MicroBlaze; 3) a Type 1 Bare Metal Hypervisor; and 4) a Boot loader; or 5) within an operating system running on bare metal Logic. The exemplary systems, devices, and/or methods may implement: 1) Known answer tests performed on instructions during power on self-tests; 2) Known answer tests performed on instructions periodically during run-time; 3) Periodicity of tests being determined by a sensor (e.g., temperature, voltage, radiation, and so on) inputs and/or thresholds that increase testing frequency when approaching thresholds and decrease testing frequency when in a normal operating range. 4) Failed instructions replacement with pre-defined alternative and/or virtual instructions during operations using, for example, existing operating instructions to perform equivalent processor functions. Exemplary instruction replacements include without limitation: 1) add can be replaced with subtract; 2) ARM NEON (i.e., vector mode) instructions can be replaced with arithmetic instructions; and 3) ARM Advanced Encryption Standard (AES) instructions can be replaced with arithmetic/shift instructions.

In one aspect, a fault recoverable computer system includes an instruction table having a plurality of processor instructions. The system also includes at least one sensor arranged to monitor an environmental condition associated with the computer system and output sensor data. A monitor module is arranged to receive the sensor data and/or processor state information. A testing module is arranged to perform a plurality of self-tests including a first self-test of the computer system and, if the first self-test fails, output a failure notification. A recovery module is arranged to update the instruction table in response to receiving the failure notification. The update includes replacing a first processor instruction arranged to perform a first function with a replacement set of processor instructions configured to alternatively perform the first function.

The replacement set of processor instructions may include one or more alternative processor instructions in the instruction table. The replacement set of processor instructions may include one or more virtual instructions. An environmental condition may include temperature, pressure, radiation level, noise level, and/or vibration level. The sensor data may include data indicating a measurement of at least one environmental condition.

In one implementation, the plurality of self-tests are performed periodically, during the computer system boot up, during a run-time idle period, and/or during a run-time interrupt period. The frequency of the plurality of self-tests may be set in response to the sensor data. The frequency of the plurality of self-tests may be increased in response to an increase of temperature, pressure, noise level, vibration level, voltage level, and/or radiation level over a period of time. In some implementations, the frequency of the plurality of self-tests is adjusted based on a minimum optimal threshold and/or a maximum optimal threshold associated with temperature, pressure, noise level, vibration level, voltage level, and/or radiation level. The modules may be implemented as hardware functions, software functions, or a combination thereof. The monitor module, testing module, and/or recovery module may be implemented via a type 1 bare metal hypervisor.

In another aspect, a method for performing fault recovery for a computer system includes: providing an instruction table including a plurality of processor instructions; receiving processor state information and/or sensor data from at least one sensor arranged to monitor an environmental condition associated with the computer system; performing a plurality of self-tests including a first self-test of the computer system and, if the first self-test fails, outputting a failure notification; and updating the instruction table in response to the failure notification, where the update includes replacing a first processor instruction arranged to perform a first function with a replacement set of processor instructions configured to alternatively perform the first function. A failure may be determined by implementing a function and/or application with a known expected result, e.g., an AES encryption operation, and observing a result that deviates from the known expected result.

A further aspect includes a non-transient computer readable medium containing program instructions for causing a computer to implement fault recovery comprising the method of: providing an instruction table including a plurality of processor instructions; receiving processor state information and/or sensor data from at least one sensor arranged to monitor an environmental condition associated with the computer system; performing a plurality of self-tests including a first self-test of the computer system and, if the first self-test fails, outputting a failure notification; and updating the instruction table in response to the failure notification, where the update includes replacing a first processor instruction arranged to perform a first function with a replacement set of processor instructions configured to alternatively perform the first function.

Any two or more of the features described in this specification, including in this summary section, may be combined to form implementations not specifically described in this specification. Furthermore, while this specification may refer to examples of systems and methods related to the ARM ISA, the implementations and methods herein equally apply to computing systems and/or processors implementing other ISAs.

The details of one or more implementations are set forth in the accompanying drawings and the following description. Other features and advantages will be apparent from the description and drawings, and from the claims.

DESCRIPTION OF THE DRAWINGS

FIG. 5 is an exemplary table of processor instructions and their alternate processor instructions that result in the same function.

Like reference numerals in different figures indicate like elements.

DETAILED DESCRIPTION

The application, in various aspects, addresses deficiencies associated with computer fault monitoring and recovery. The application includes exemplary devices, systems and methods for monitoring a computer processor and enabling the processor to effectively recover from detected faults.

Figure 1:
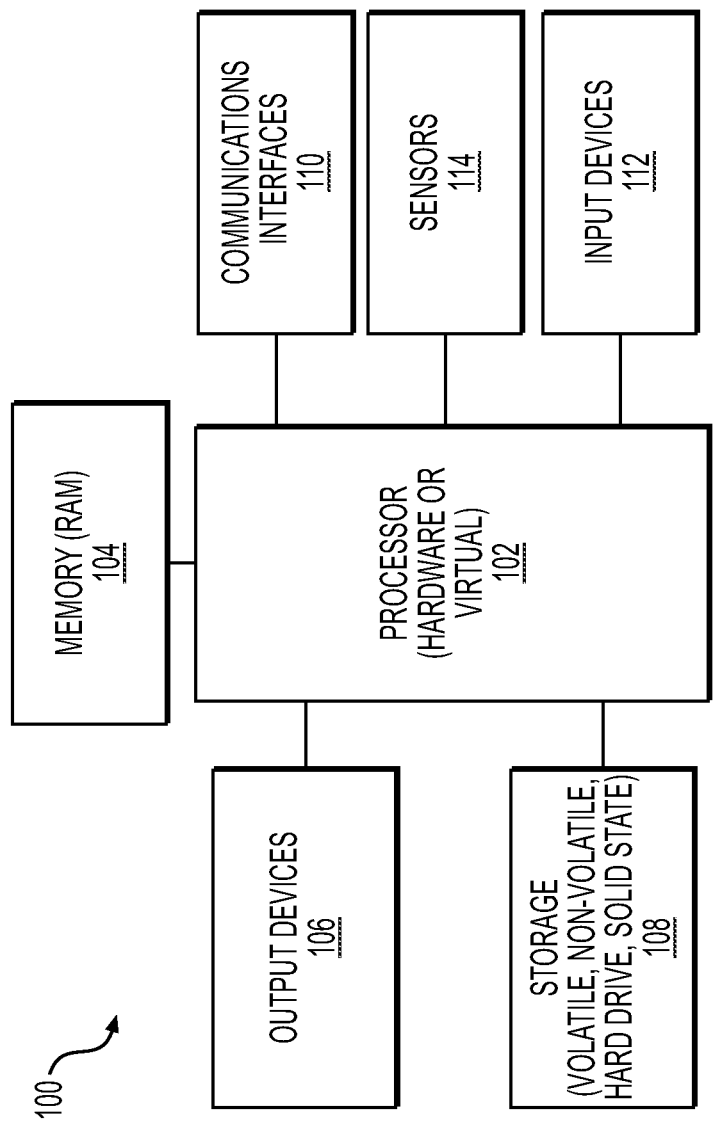
FIG. 1 is a block diagram of an exemplary computer system.

FIG. 1 is a block diagram of an exemplary computer system 100. Computer system 100 could represent a processing system within a device such as, for example, a satellite or aircraft. Computer system 100 could be a SoC, client device, and/or a physical server device and could include either hardware or virtual processor(s) depending on the level of abstraction of the computing device. In some implementations, computer system 100 and its elements as shown in FIG. 1 each relate to physical hardware and in some implementations one, more, or all of the elements could be implemented using emulators or virtual machines as levels of abstraction. In any case, no matter how many levels of abstraction away from the physical hardware, computing device 100, at its lowest level, may be implemented on physical hardware.

As also shown in FIG. 1, computer system 100 may include one or more input devices 112, such as a keyboard, mouse, touchpad, or sensor readout (e.g., biometric scanner) and one or more output devices 106, such as displays, speakers for audio, or printers. Some devices may be configured as input/output devices also (e.g., a network interface or touchscreen display). Computer system 100 may also include communications interfaces 110, such as a network communication unit that could include a wired communication component and/or a wireless communications component, which may be communicatively coupled to processor 102. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

Computer system 100 includes a processing element, such as processor 102, that contains one or more hardware processors, where each hardware processor may have a single or multiple processor cores. In one implementation, the processor 102 includes at least one shared cache that stores data (e.g., computing instructions) that are utilized by one or more other components of processor 102. For example, the shared cache may be a locally cached data stored in a memory for faster access by components of the processing elements that make up processor 102. In some implementations, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 1, the processing elements that make up processor 102 may also include one or more other types of hardware processing components, such as graphics processing units (GPUs), application specific integrated circuits (ASICs), field-programmable gate arrays (FPGAs), and/or digital signal processors (DSPs).

FIG. 1 illustrates that memory 104 may be operatively and communicatively coupled to processor 102. Memory 104 may be a non-transitory medium configured to store various types of data. For example, memory 104 may include one or more storage devices 108 that comprise a non-volatile storage device and/or volatile memory. Volatile memory, such as random access memory (RAM), can be any suitable non-permanent storage device. The non-volatile storage devices 108 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 108 may be used to store overflow data if allocated RAM is not large enough to hold all working data. The non-volatile storage devices 108 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 102. In one implementation, the compiling process of the software program may transform program code written in a programming language to another computer language such that the processor 102 is able to execute the programming code. For example, the compiling process of the software program may generate an executable program that provides encoded instructions (e.g., machine code instructions) for processor 102 to accomplish specific, non-generic, particular computing functions.

After the compiling process, the encoded instructions may then be loaded as computer executable instructions or process steps to processor 102 from storage 108, from memory 104, and/or embedded within processor 102 (e.g., via a cache or on-board ROM). Processor 102 may be configured to execute the stored instructions or process steps in order to perform instructions or process steps to transform the computing device into a non-generic, particular, specially programmed machine or apparatus. Stored data, e.g., data stored by a storage device 108, may be accessed by processor 102 during the execution of computer executable instructions or process steps to instruct one or more components within the computing device 100.

A user interface (e.g., output devices 106 and input devices 112) can include a display, positional input device (such as a mouse, touchpad, touchscreen, or the like), keyboard, or other forms of user input and output devices. The user interface components may be communicatively coupled to processor 102. When the output device is or includes a display, the display can be implemented in various ways, including by a liquid crystal display (LCD) or a cathode-ray tube (CRT) or light emitting diode (LED) display, such as an OLED display. Sensors 114 may include one or more sensors that detect and/or monitor environmental conditions within or surrounding device 100. Environmental conditions may include temperature, pressure, acceleration, vibration, motion, radiation level, and/or position. Sensors 114 may include one or more sensors that monitor computing operations of device 100 including, for example, data traffic, instruction operations, idle condition or state, voltage, and/or circuitry operations. Persons of ordinary skill in the art are aware that computer system 100 may include other components well known in the art, such as powers sources and/or analog-to-digital converters, not explicitly shown in FIG. 1.

In some implementations, computing system 100 and/or processor 102 includes an SoC having multiple hardware components, including but not limited to:

a microcontroller, microprocessor or digital signal processor (DSP) core and/or multiprocessor SoCs (MPSoC) having more than one processor cores;

memory blocks including a selection of read-only memory (ROM), random access memory (RAM), electronically erasable programmable read-only memory (EEPROM) and flash memory;

timing sources including oscillators and phase-docked loops;

peripherals including counter-timers, real-time timers and power-on reset generators;

external interfaces, including industry standards such as universal serial bus (USB), FireWire, Ethernet, universal synchronous/asynchronous receiver/transmitter (USART), serial peripheral interface (SPI);

analog interfaces including analog-to-digital converters (ADCs) and digital-to-analog converters (DACs); and voltage regulators and power management circuits.

A SoC includes both the hardware, described above, and software controlling the microcontroller, microprocessor and/or DSP cores, peripherals and interfaces. A design flow for a SoC aims to develop this hardware and software in parallel. Most SoCs are developed from pre-qualified hardware blocks for the hardware elements (e.g., referred to as modules or components which represent an IP core, or IP block), together with software drivers that control their operation. The above listing of hardware elements is not exhaustive. A SoC may include protocol stacks that drive industry-standard interfaces like a USB.

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as IEEE 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. One or more features of system 100 may be implemented within the systems and processors described with respect to FIGS. 2, 3, and 4.

Figure 2:
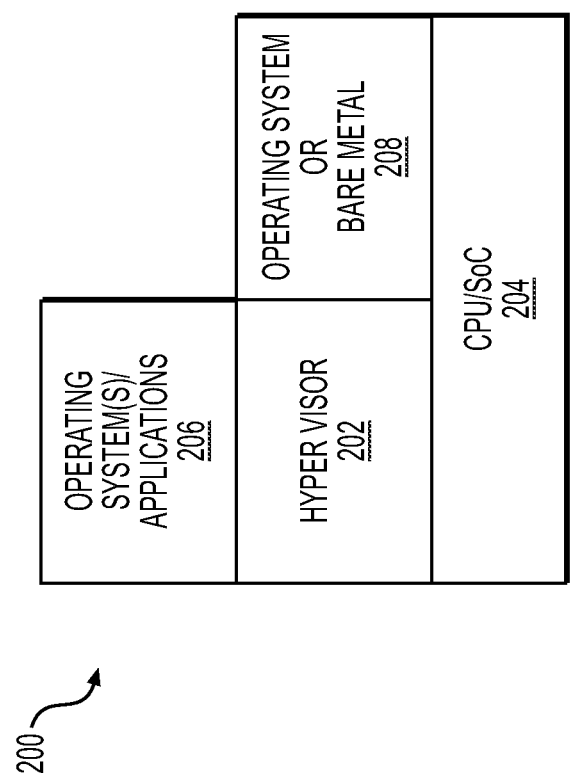
FIG. 2 is a block diagram of a computer system architecture including a hypervisor.

FIG. 2 is a block diagram of a computer system architecture 200 including a hypervisor 202 that implements hardware virtualization for CPU/SoC 204. Hypervisor 202 may include a Type 1 bare metal Hypervisor. Hypervisor 202 that may run directly on the system architecture 200 hardware and/or CPU/SoC 204 to control the hardware and/or to manage guest operating systems and/or applications 206. For this reason, hypervisor 202 may be referred to as a bare metal hypervisor. Computer system architecture 200 may include one or more operating systems (OS) or bare metal 208 that interact independently and/or in parallel with hypervisor 202.

In some implementations, hypervisor 202 implements one or modules and/or functions to perform processor fault monitoring, fault self-testing, and/or recovery from detected faults such as will be described in more detail with respect to FIGS. 3 and 4. Although not shown, system 200 may include one or more Type 2 or hosted hypervisors. A Type 2 hypervisor may run on OS 208 in a similar manner as other computer applications. A guest operating system runs as a process on the host. Type 2 hypervisors abstract guest operating systems from the host operating system. A type 2 hypervisor may be implemented to perform some or all of processor fault monitoring, fault self-testing, and/or recovery from detected faults such as will be described in more detail with respect to FIGS. 3 and 4.

Figure 3:
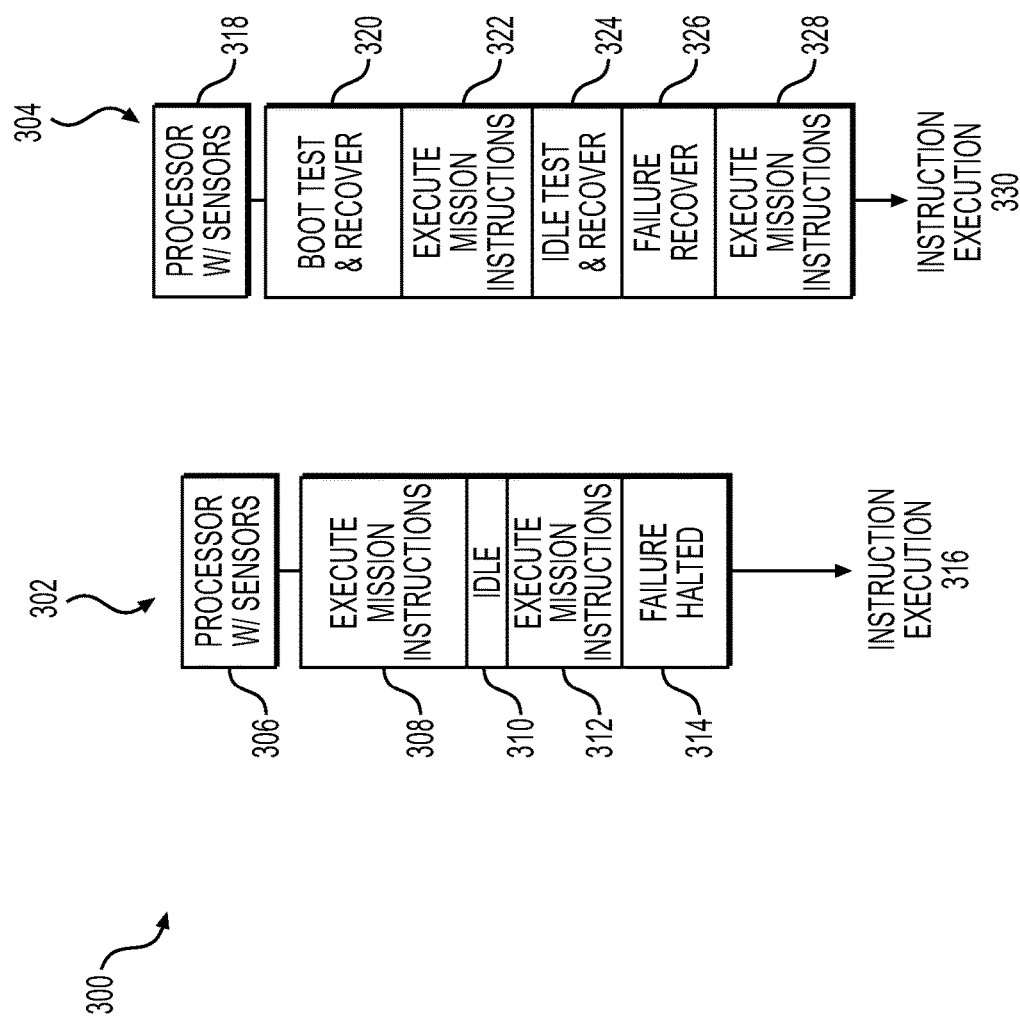
FIG. 3 is a comparative diagram of a process without failure recovery versus a process with failure recovery.

FIG. 3 is a comparative diagram 300 of a process with failure recovery 304 versus a process without failure recovery 302. Processor 306 typically performs various operations via an instruction execution sequence 316 according to process 302 without failure recovery. In this scenario, processor 306 executes mission instructions 308, enters an idle state 310, executes mission instructions 312, but when an instruction failure occurs, enters a failure halted state 314 where processor 306 ceases to function. In contrast with processor 306, processor 318 performs various operations via an instruction execution sequence 330. But when a failure is encountered, processor 318 recovers and continues to function. In such a scenario, processor 318 enters a boot test and recovery mode 320 where processor 318 performs one or more self-tests of various instructions to detect any failure and recover from the detected failure. In one implementations, recovery includes replacing a failed processor instruction arranged to perform a particular function with a replacement set of processor instructions configured to alternatively perform the particular function.

After boot test and recovery mode 320 completes, processor 318 executes mission instructions 322. Then, processor 318 enters an idle and test recovery state and/or mode 324 where processor 318 performs one or more self-tests of various instructions to detect any failure and recover from the detected failure. In certain implementations, recovery includes replacing a failed processor instruction arranged to perform a particular function with a replacement set of processor instructions configured to alternatively perform the particular function, resulting in a failure recover state 326. Then processor 318 executes mission instructions 328. By implementation process 304 with failure recovery, processor 318 advantageously and resiliently continues to operate even after experiencing one or more instruction failures.

Figure 4:
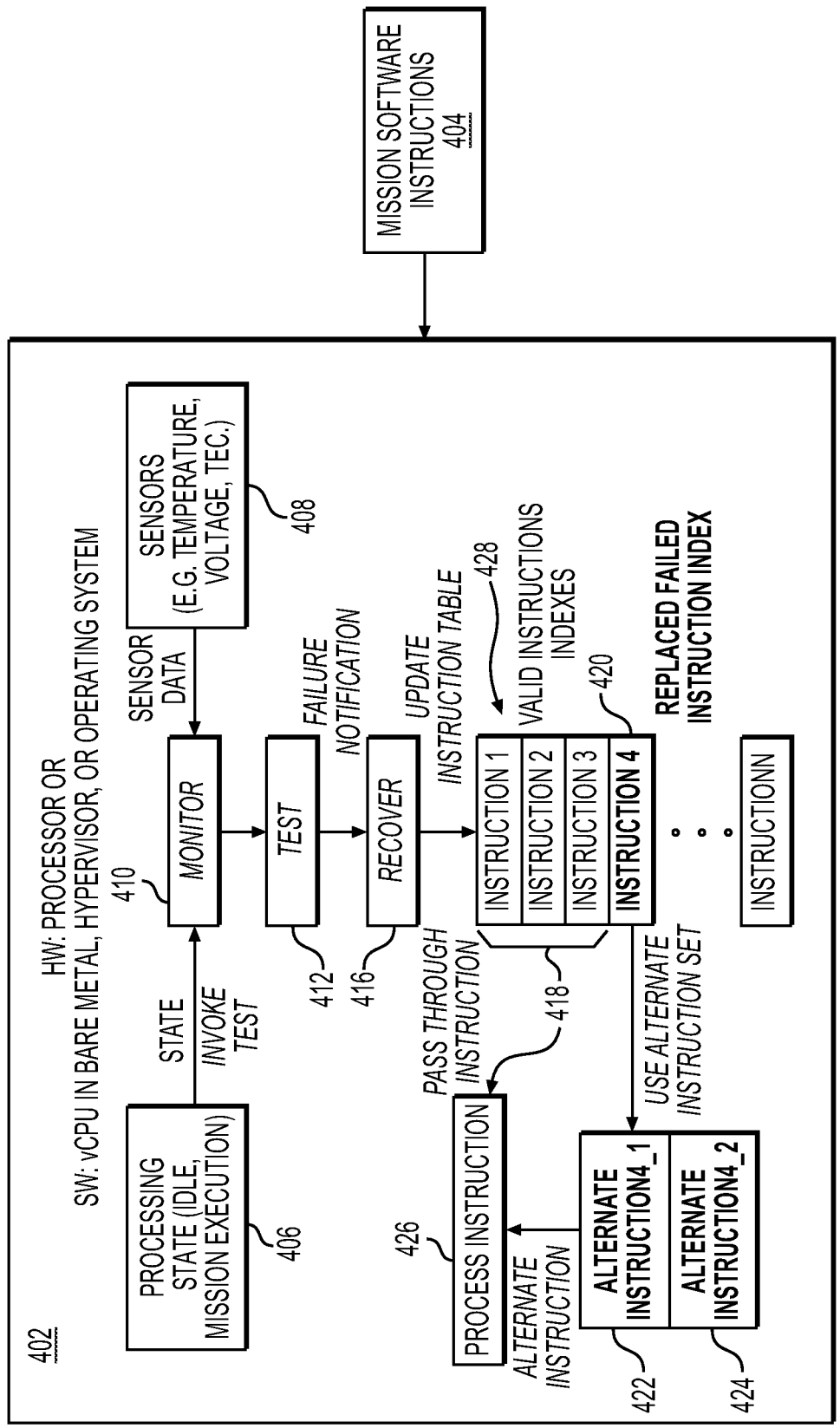
FIG. 4 is a block diagram of a computer system performing a processor instruction replacement in response to a detected failure.

FIG. 4 is a block diagram of a computer system 400 performing a processor instruction replacement in response to a detected failure. Computer system 400 may include a processor 402 implemented via and/or including a hardware processor, a software-based processor, a virtual central processing unit (CPU) in bare metal, a hypervisor, and/or an operating system. Processor 402 is arranged to receive mission software instructions 404 via a data interface such as communications interfaces 110 of FIG. 1. Processor 402 includes a monitor modules and/or function 410 arranged to receive sensor data from one or more sensors 408. Sensors 408 may monitor environmental conditions related to and/or within the vicinity of processor 402. Monitor 410 may also receive state information and/or data 406 indicating whether processor 402 is in an idle state or a mission execution state. Processor 402 also includes a test module and/or function 412 arranged to perform one or more self-tests of instructions of processor 402. If test module 412 detects a failure of an instruction during a self-test, test module 412 issues a failure notification to recovery module and/or function 416 indicating a failed instruction 420. Processor 402 includes an instruction table 428 with multiple processor instructions such as shown in FIG. 5.

The failure notification may identify an instruction based on an index of the failed instruction within table 428. In response to the failure notification with respect to failed instruction 420, recovery module 416 updates an instruction table 428 by replacing failed instruction 420 with alternate instructions 422 and 424 that perform the same function as instruction 420. Recovery module 416 may change an index label and/or pointer in table 428 from failed instruction 420 to alternate instructions 422 and 424 to enable the instruction replacement. Once the instruction replacement is complete, processor 402 may then execute processor instruction 426 using a sequence of instructions including pass through instructions 418 and alternate instructions 422 and 424. In this way, processor 402 is able to detect and recover from failed instructions such as failed instruction 420 to, thereby, resiliently continue operations.

The alternate instructions and/or replacement set of processor instructions 422 may include one or more virtual instructions. Environmental condition detected by sensors 408 may include temperature, pressure, radiation level, noise level, voltage level, and/or a vibration level. The sensor data may include data indicating a measurement of one or more environmental conditions. Processor 402 may invoke and/or perform multiple self-tests during operations of processor 402. The multiple self-tests may be performed periodically, during processor 402 and/or system 400 boot up, during a run-time idle period, and/or during a run-time and/or mission execution interrupt period. The frequency of the multiple self-tests may be set in response to the sensor data. For example, the frequency of the self-tests may be increased in response to an increase in temperature, pressure, noise level, vibration level, voltage level, and/or radiation level over a period of time or may be decreased in response to a decrease increase in temperature, pressure, noise level, vibration level, voltage level, and/or radiation level over a period of time. In certain implementations, the frequency of the self-tests may be increased in response to approaching the optimal operating levels in temperature, pressure, noise level, vibration level, voltage level, and/or radiation level. Likewise, the frequency of the self-tests may be decreased in response to receding from sub-optimal to optimal temperature, pressure, noise, level, vibration level, voltage level, and/or radiation level over a period of time. Processor 402 may adjust the frequency of self-tests based on a minimum optimal operating boundary and a maximum operating boundary because exceeding the optimal boundaries results in a sub-optimal operating environment. An example with temperature may include a minimum of −20 degrees Celsius and a maximum of 40 degrees Celsius. These optimal thresholds may be external inputs into the monitoring module, and may be set and/or specified by the developer of the modules, processors, and/or SoCs. Modules 410, 412, and 416 may be implemented as hardware functions, software functions, or a combination thereof. Monitor module 410, testing module 412, and/or recovery module 416 may be implemented by a type 1 bare metal hypervisor.

FIG. 5 is an exemplary table 500 of processor instructions and their alternate processor instructions that result in the same function. Column 502 includes a list of processor instructions. Column 504 includes a list of alternative sets of instructions. Column 506 includes descriptions of how each of the alternative sets of instructions achieve the same function as their corresponding instructions. Row 508 includes an "add" instruction and its corresponding alternative and/or replacement set of instructions in column 504 and the description of how the "sub r3, o, r3" and "sub r1, 0, r3" instructions achieve the same function. Row 510 includes a "sub" instruction and its corresponding alternative set of instructions in column 504 and the description of how the "mul r3, −1" and "add r1, r2, r3" instructions achieve the same function. Row 512 includes a "mul" instruction and its corresponding alternative set of instructions in column 504 and the description of how the alternative set of instructions achieve the same function.

Figure 6:
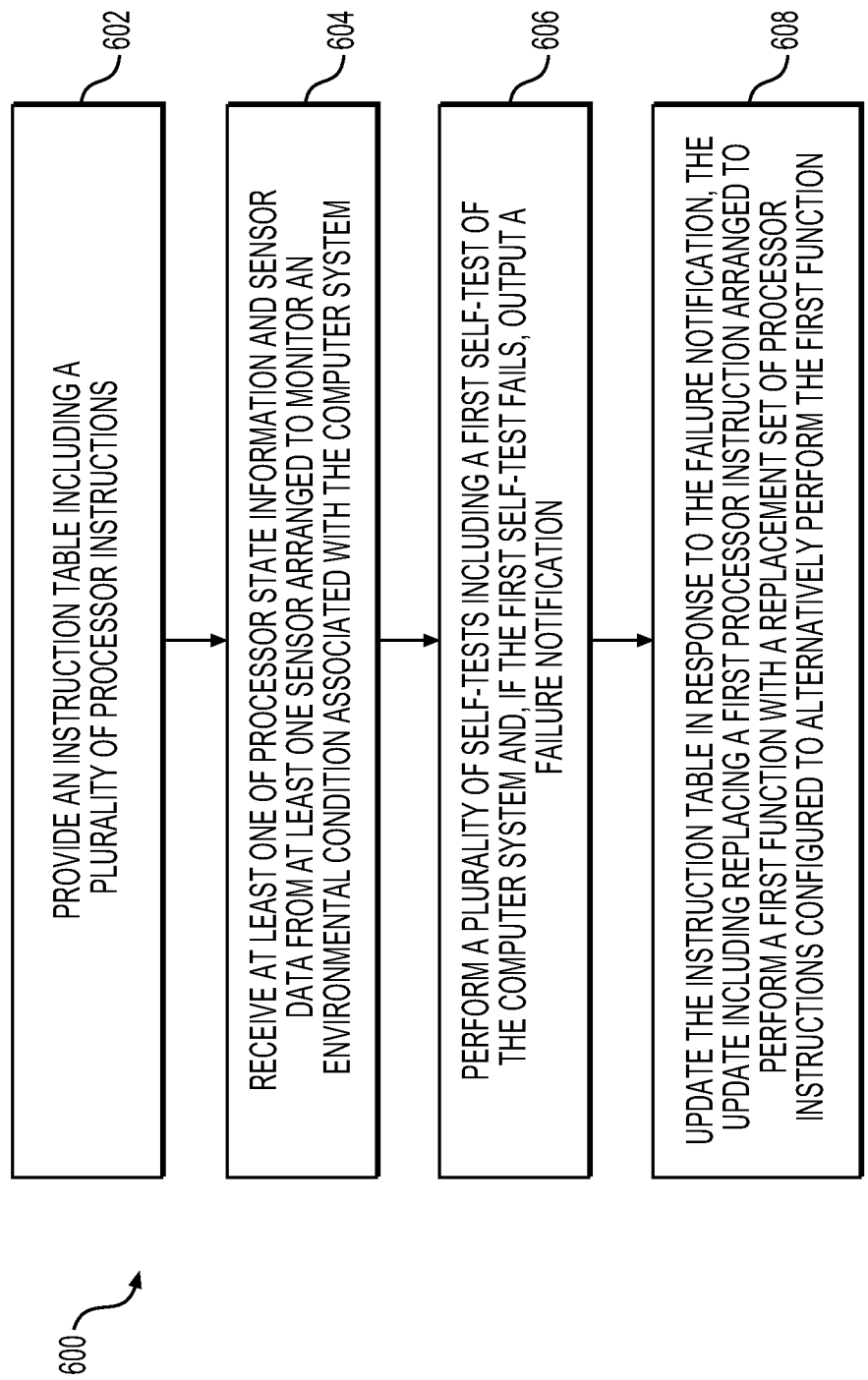
FIG. 6 is a process for performing failure recovery.

FIG. 6 is a process 600 for performing failure recovery of a processor and/or computer system such as system 100, processor 318, system 400, and processor 402. Process 600 includes: providing an instruction table such as table 428 or 500 including a plurality of processor instructions such as instructions in column 502 of table 500 (Step 602); receiving at least one of processor state information 406 and sensor data from at least one sensor 408 arranged to monitor an environmental condition associated with a computer system such as system 100, processor 318, system 400, and/or processor 402 (Step 604); performing a plurality of self-tests including a first self-test of the computer system and, if the first self-test fails, outputting a failure notification (Step 606); and updating the instruction table 428 or 500 in response to the failure notification, where the update includes replacing a first processor instruction, e.g., instruction 420, arranged to perform a first function with a replacement set of processor instructions, e.g., alternative instructions 422 and 424, configured to alternatively perform the first function (Step 608).

It will be apparent to those of ordinary skill in the art that certain aspects involved in the operation of device 100, architecture 200, processor 318, system 400, processor 402, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A fault recoverable computer system comprising:
    an instruction table including a plurality of processor instructions;
    at least one sensor arranged to monitor an environmental condition associated with the computer system and output sensor data;
    a monitor module arranged to receive at least one of the sensor data and processor state information;
    a testing module arranged to perform a plurality of self-tests including a first self-test of the computer system and, if the first self-test fails, output a failure notification; and
    a recovery module arranged to update the instruction table in response to receiving the failure notification, the update including replacing a first processor instruction arranged to perform a first function with a replacement set of processor instructions configured to alternatively perform the first function;
    where in the modules are implemented as hardware functions or a combination of hardware functions and software functions.

2. The system of claim 1, wherein the replacement set of processor instructions includes one or more alternative processor instructions in the instruction table.

3. The system of claim 1, wherein the replacement set of processor instructions includes one or more virtual instructions.

4. The system of claim 1, wherein the at least one environmental condition includes at least one of temperature, voltage level, pressure, radiation level, noise level, and vibration level.

5. The system of claim 4, wherein the sensor data includes data indicating a measurement of the at least one environmental condition.

6. The system of claim 1, wherein the plurality of self-tests are performed at least one of periodically, during the computer system boot up, during a run-time idle period, and during a run-time interrupt period.

7. The system of claim 6, wherein a frequency of the plurality of self-tests is set in response to the sensor data.

8. The system of claim 7, wherein the frequency of the plurality of self-tests is adjusted based on at least one of a minimum optimal threshold and a maximum optimal threshold associated with of at least one of temperature, pressure, noise level, vibration level, voltage level, and radiation level.

9. The system of claim 1, wherein at least one of the monitor module, testing module, and recovery module includes a type 1 bare metal hypervisor.

10. A method for performing fault recovery for a computer system comprising:
    providing an instruction table including a plurality of processor instructions;
    receiving at least one of processor state information and sensor data from at least one sensor arranged to monitor an environmental condition associated with the computer system;
    performing a plurality of self-tests including a first self-test of the computer system and, if the first self-test fails, outputting a failure notification; and
    updating the instruction table in response to the failure notification, the update including replacing a first processor instruction arranged to perform a first function with a replacement set of processor instructions configured to alternatively perform the first function.

11. The method of claim 10, wherein the replacement set of processor instructions includes one or more alternative processor instructions in the instruction table.

12. The method of claim 10, wherein the replacement set of processor instructions includes one or more virtual instructions.

13. The method of claim 10, wherein the at least one environmental condition includes at least one of temperature, voltage level, pressure, radiation level, noise level, and vibration level.

14. The method of claim 10 comprising performing the plurality of self-tests at least one of periodically, during the computer system boot up, during a run-time idle period, and during a run-time interrupt period.

15. The method of claim 14 comprising setting a frequency of the plurality of self-tests in response to the sensor data.

16. The method of claim 15 comprising adjusting the frequency of the plurality of self-tests based on at least one of a minimum optimal threshold and a maximum optimal threshold associated with of at least one of temperature, pressure, noise level, vibration level, voltage level, and radiation level.

17. The method of claim 10 comprising implementing the method as hardware functions or a combination of hardware functions and software functions.

18. The method of claim 10, wherein at least one of receiving the processor state information, receiving the sensor data, performing the plurality of self-tests, and updating the instruction table includes utilizing a type 1 bare metal hypervisor.

19. A non-transient computer readable medium containing program instructions for causing a computer to implement fault recovery comprising the method of:
   providing an instruction table including a plurality of processor instructions;
   receiving at least one of processor state information and sensor data from at least one sensor arranged to monitor an environmental condition associated with the computer system;
   performing a plurality of self-tests including a first self-test of the computer system and, if the first self-test fails, outputting a failure notification; and
   updating the instruction table in response to the failure notification, the update including replacing a first processor instruction arranged to perform a first function with an replacement set of processor instructions configured to perform the first function.

* * * * *